United States Patent [19]

Thomas et al.

[11] Patent Number: 4,995,733
[45] Date of Patent: Feb. 26, 1991

[54] MEASUREMENT SENSOR FOR THE DETECTION OF TEMPERATURES IN METAL OR ALLOY MELTS

[75] Inventors: Friedrich-Werner Thomas, Gelnhausen; Jürgen Schädlich-Stubenrauch; Alfred Hediger, both of Aachen, all of Fed. Rep. of Germany

[73] Assignee: Leybold Aktiengesellschaft, Hanau, Fed. Rep. of Germany

[21] Appl. No.: 453,101

[22] Filed: Dec. 13, 1989

Related U.S. Application Data

[63] Continuation of Ser. No. 193,770, May 13, 1988, abandoned.

[30] Foreign Application Priority Data

May 14, 1988 [DE] Fed. Rep. of Germany ....... 3716145

[51] Int. Cl.$^5$ .......................... G01K 7/04; G01K 1/08; H01L 35/02
[52] U.S. Cl. ..................................... 374/140; 374/179; 164/150; 136/233
[58] Field of Search .................. 136/230, 232–234, 136/237; 266/99; 374/26, 137, 139, 179, 140, 25, 53; 164/4.1, 150

[56] References Cited

U.S. PATENT DOCUMENTS

| | | | |
|---|---|---|---|
| 2,223,408 | 12/1940 | Dietert | 374/179 |
| 2,975,225 | 3/1961 | Barbieri et al. | 136/233 |
| 3,204,460 | 9/1965 | Milnes | 73/295 |
| 3,321,973 | 5/1967 | Anderson | 164/4.1 |
| 3,467,542 | 9/1969 | Nordlie | 136/233 |
| 3,589,979 | 6/1971 | Finch et al. | 162/219 |
| 3,745,828 | 7/1973 | Howell | 73/295 |
| 4,015,657 | 4/1977 | Petrov et al. | 164/361 |
| 4,175,438 | 11/1979 | Wenzl et al. | 136/224 |
| 4,396,792 | 8/1983 | Falk | 136/234 |

FOREIGN PATENT DOCUMENTS

| | | | |
|---|---|---|---|
| 3436331 | 4/1986 | Fed. Rep. of Germany | 164/150 |
| 94625 | 6/1982 | Japan | 374/139 |
| 73151 | 4/1984 | Japan | 164/150 |
| 573726 | 9/1977 | U.S.S.R. | 136/233 |
| 1191751 | 11/1985 | U.S.S.R. | 374/179 |
| 627610 | 8/1949 | United Kingdom . | |
| 1095812 | 12/1967 | United Kingdom . | |
| 1252537 | 11/1971 | United Kingdom . | |
| 1320820 | 6/1973 | United Kingdom . | |
| 1458559 | 12/1976 | United Kingdom . | |
| 2112570 | 7/1983 | United Kingdom . | |
| 2125169 | 2/1984 | United Kingdom | 374/179 |
| 2155238 | 9/1985 | United Kingdom . | |

Primary Examiner—William A. Cuchlinski, Jr.
Assistant Examiner—W. Morris Worth
Attorney, Agent, or Firm—Felfe & Lynch

[57] ABSTRACT

The invention concerns a measurement sensor for the detection of temperatures in metal or alloy melts. This measurement sensor consists of a thermocouple (41) surrounded by a ceramic capillary (24) which is closed at its end by means of an adhesive (45) or the like. This measurement sensor is directly, i.e. without further sheathing, introduced into the melt (FIG. 3a).

4 Claims, 3 Drawing Sheets

MEASUREMENT SENSOR FOR THE DETECTION OF TEMPERATURES IN METAL OR ALLOY MELTS

This application is a continuation of application Ser. No. 193,770, filed May 13, 1988, now abandoned.

The invention concerns a measurement sensor for the detection of temperatures in metal or alloy melts.

In the manufacture of high-grade metals or metal alloys it is necessary accurately to determine the course of solidification of the melt, because in the event of faulty solidification the end-product may contain significant defects. For instance, in the manufacture of directional and monocrystalline turbine blades precise calibrations are undertaken in order both to measure the temperature gradients during the solidification and in front of the solidification front as well as the growth rate of the solidification front. This measurement is in general performed with the aid of thermocouples which are at an exactly defined spacing from each other. The accurately measured temperatures then permit an approximate computation of the temperature gradient and the growth rate in front of the solidification along a predetermined direction.

It is already known to utilize thermocouples with protective tubes from a ceramic material or from platinumrhodium for the measurement of temperatures in melts (Körtvélyessy: Thermoelement Praxis, ('Thermocouple Practice') Essen, 1981, p. 195–198).

Thermocouple wires of this type should in such cases be as thick as possible and should, for instance, have a diameter of 0.5 mm. The electrical insulation of the thermocouple wires takes place with the aid of double-bore capillaries which have a diameter of 2.5-3 mm and a capillary bore of 0.7 mm. The weld beads of the tip of the thermocouple is insulated from the melt with a ceramic protective tube closed on one side and having an internal diameter of 3-3.5 mm and an outer diameter of 4 mm.

However, it is here disadvantageous that the thick ceramic walls, the large weld beads as well as the undefined heat transfers at the sensor tip cause a very unfavorable dynamic temperature relation. In addition, by the utilization of protective tubes closed on one side with internally lying double-bore capillaries the diameter of these protective tubes relative to the geometry of the component is too great, whereby excessive errors arise in the determination of temperature gradients. Further, high response times arise because a large mass has to be heated or cooled and the heat transfer is poor. Furthermore, measurement locations result in a strong influencing of the temperature field in the melt.

In addition, a thermocouple configuration for the measurement of temperatures in hot flowing gases is known in which a sleeve with numerous uniformly distributed holes is provided (U.S. Pat. No. 2,975,225). It is here disadvantageous that the weld beads and the sheath are not sealed against chemically aggressive metallic melts.

Further, a process is known for the manufacture of insulated heat sensing thermocouples which are arranged between layers of a slurry containing water, a binder and refractory fibers, so that the electric supply leads projects over the layers (U.S. Pat. No. 3,589,979). However, here the thermocouples are not sealed against chemically aggressive melts. Moreover, with this process thermocouple elements of small dimensions with sufficient mechanical rigidity cannot be produced.

Finally, another temperature measurement probe is also known which has noble metal thermocouple wires which are connected at one end with a bead-shaped temperature-conducting body and which are guided between the temperature-conducting body and terminals to indicating or controlling devices in a tubular probe body conveying cooling water for cooling the thermocouple wires (U.S. Pat. No. 4,175,438). Here, in addition to the thermocouple wires, there are two supporting wires connected with the temperature-conducting body which are also guided in the probe body. It is a drawback of this probe, which is a comb-type probe, that the individual measurement locations cannot be positioned very precisely. In addition, the measurement locations are not insulated in a melt-tight manner.

The underlying task of the invention is to keep the temperature measurement sensor in the detection of temperature at the solidification front of a melt as small as possible.

This task is solved according to the features of claim 1.

The advantage achieved by the invention consists particularly in that additional sheathing of the measurement sensor tip is obviated. By virtue of the fact that the measurement sensor tip projects directly into the melt and is built into the casing mold, the sensitivity of the measurement is enhanced. In addition, the utilization of particular, uninterrupted protective capillaries achieves protection of the legs of the thermocouple from contamination by Si and C. These holding capillaries are subjected to the furnace temperature from one side only and hence may very well fulfill their task of carrying the legs of the thermocouple together with the protective covering. Because of the compact manner of construction the shortest thermocouple leg lengths become possible which signifies a very low requirement of PtRh wire, of which the thermocouple legs are normally made. Furthermore, the site of the connection between one of the legs of the thermocouple and an equalizing conductor remains cold and at a constant temperature by means of suitable cooling and insulation, whereby stability times of at least three hours result. It is of particular significance that by way of the utilization of several very small measurement sensors according to the invention temperature gradients and other relevant parameters derivable from the time-temperature curve and relevant to the formation of the structure of the melt may be detected.

A preferred embodiment of the invention is represented in the drawings and will be described in greater detail below. In the drawings.

Figure 1:
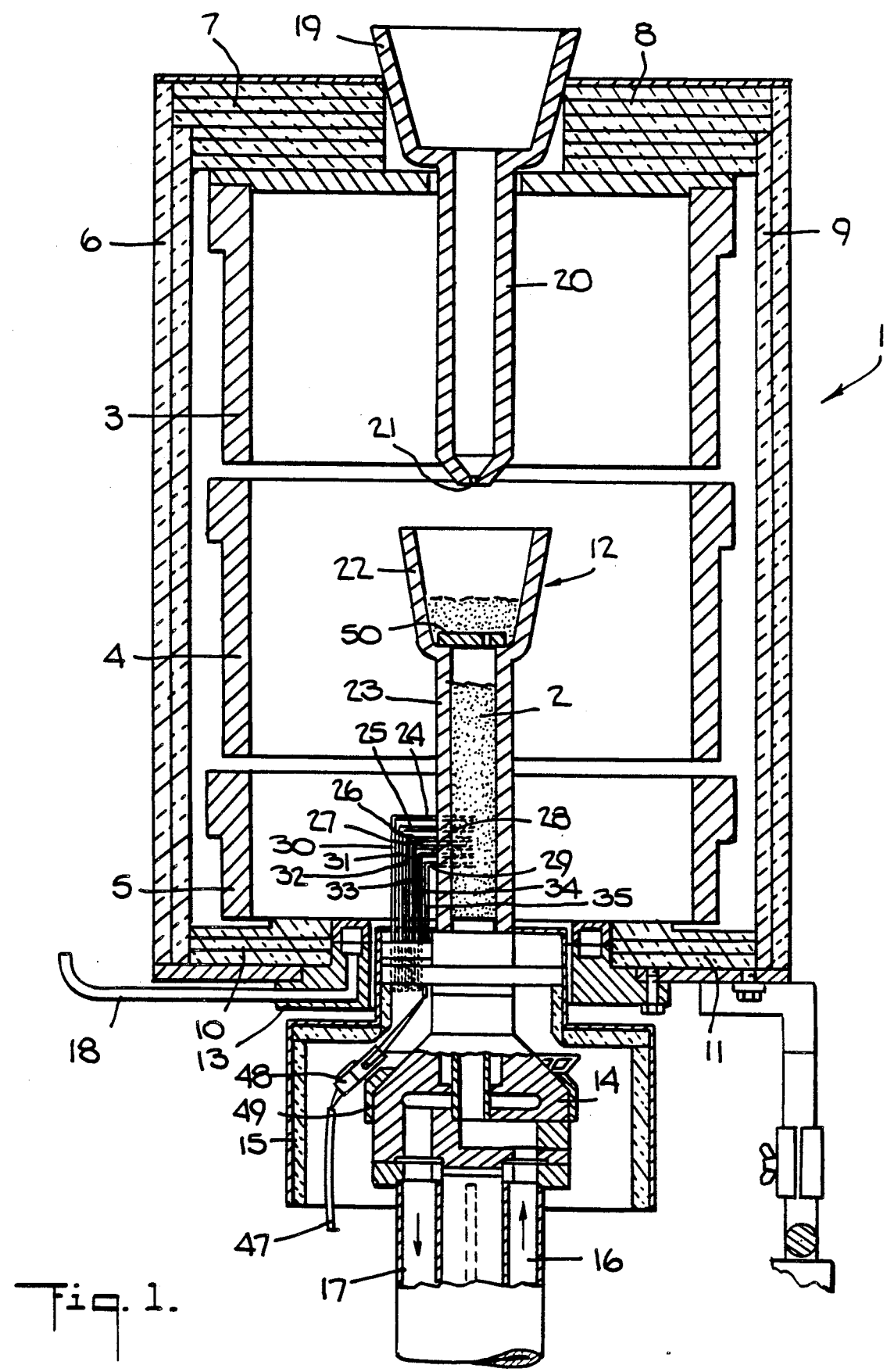
FIG. 1 shows a vacuum furnace with a graphite heater apparatus.

A cross-sectional lateral view of a vacuum furnace for the directional solidification of a melt is illustrated in FIG. 1. This vacuum furnace 1 has three graphite heating elements 3, 4, 5 of cylindrical outer configurations protected by insulation 6–11 from heat losses. For insulation-technical reasons gaps are provided between the heating elements 3, 4, 5. The electrical connections of the heating elements 3, 4, 5 are not shown in FIG. 1. The heating elements are required to keep the melt liquid and to achieve a directional solidification of the melt by means of a heat flux which is as one-dimensional as possible. In order to produce the temperature gradients required for the solidification of the melt 2, a guide wall 13 is provided next to and beneath the insulation region 10. A cooling head 14 may be freely vertically moved in this guide wall 13 and is surrounded by a heat shield 15. The cooling head 14 has supply and discharge water ducts 16, 17, respectively, through which coolant water flows. A further water coolant supply pipe 18 is provided within the guide wall 13 and underneath the insulation region 10. The corresponding discharge water coolant pipe cannot be seen in FIG. 1 because it is concealed by the water coolant pipe 18. The cooling via the water coolant pipe 18 is required in order that when the molding dish 12 is lowered the temperature gradient should remain preserved by radiation of heat from the molding dish 12, because in this case the cooling head 14 no longer has any effect. The cooling head 14 has an influence during the initial phase of the solidification on the heat economy of the melt 2.

The melt 2 is poured in via a sprue 19 which has a relatively long pipe 20 with a small opening 21, into a molding dish 12 which consists of an upper funnel-like structure 22 and a lower pipe 23 arranged above the cooling head 14. Between the funnel-like structure 22 and the pipe there is a ceramic filter 50 which is still covered with the melt 2 after the melt 2 has been poured in. In place of a pipe 23 another mold may be provided which has any other desired geometry, for instance the geometry of a turbine blade. The casting or molding dish 12 consists preferably of a ceramic body which is destroyed after the casting process.

The thermocouple wires essentially for the present invention are disposed within measurement capillaries 24–29 and holding capillaries 30–35 by means of which they are protected from an aggressive furnace atmosphere. The temperature of the solidification front of the melt 2 is detected with the aid of this plurality of thermocouples. The pick-off of the thermal stresses takes place via compensating conductors 47. These are protected from the heat radiation of the heating elements 3, 4, 5 by means of a heat shield 15 and are secured to a cable grip 49 by way of plastics plug-and-socket connections 48. Although in FIG. 1 only one plastics plug-and-socket connection 48 is shown, nevertheless in practice for each thermocouple there is a discrete plug-and-socket connection and a discrete compensating lead connected to a non-illustrated analyzer device. FIG. 1 only shows a few measurement and holding capillaries. In practice many more measuring and holding capillaries may be provided.

Figure 2:
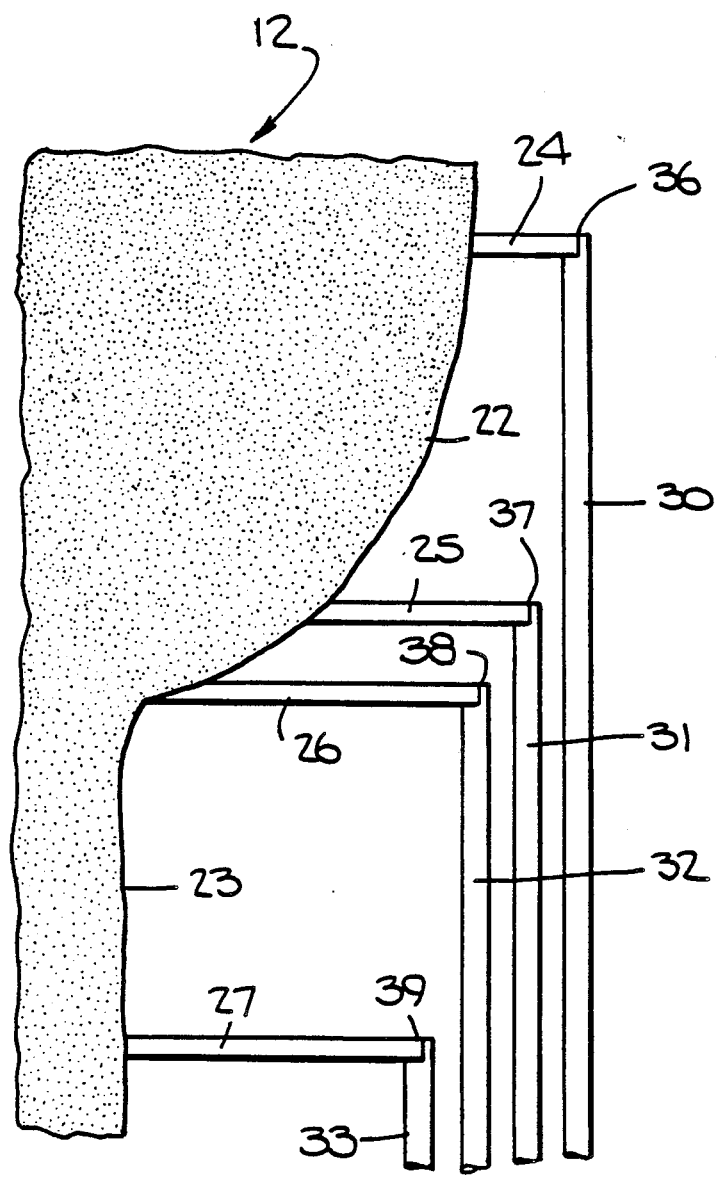
FIG. 2 shows holding capillaries and measurement capillaries connected to a casting dish.

In FIG. 2 the measurement capillaries 24–27 as well as the holding capillaries 30–33, which incorporate the thermocouple legs, are shown again on an enlarged scale. The upper part 22 of the dish 12 may also be seen. While in FIG. 1 the linking-up of the thermocouples to the lower part 23 of the dish 12 is shown, the linking-up of the thermocouples to the upper part 22 of this dish 12 is shown in FIG. 2. Reference numbers 36–39 designate the locations at which the thermocouple wires are bent. At these locations 36–39 refractory cement is provided for hermetically sealing the legs of the thermocouples. In order additionally to support the measurement capillaries 24–27 the upper ends of the holding capillaries 30–33 are polish-ground at right-angles.

Figure 3A:
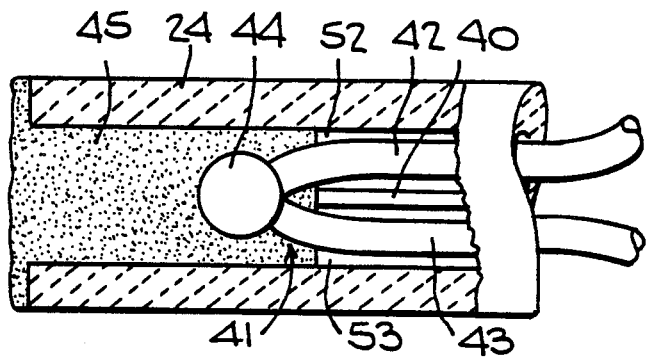
FIGS. 3a and 3b illustrate a thermocouple sheathed with a ceramic tube.

FIG. 3a shows a partial section through a measurement capillary 24 which consists e.g. of a ceramic material. In this ceramic capillary 24 a thermocouple 41 is disposed, consisting of two thermocouple legs 42, 43 and a solder or weld location 44. The front part of the thermocouple legs 42, 43 as well as the weld location 44 are immersed in an $Si-O_2$-free filler refractory adhesive 45 or weld material. The measurement capillary 24 is no longer sheathed, which is a decisive advantage of the invention.

The refractory adhesive preferably has a thermal stability even at temperatures over 1500° C. and its shrinkage properties preferably are matched to the sheath surrounding it.

Figure 3B:
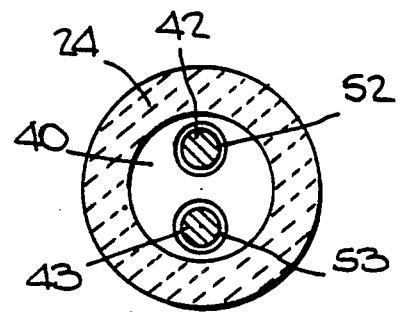

A plan view of the ceramic capillary 24 with the two thermocouple legs 42, 43 is illustrated in FIG. 3b. In an actual embodiment the measuring capillary 24 has a thermocouple with a diameter of e.g. 0.1 mm, while the capillary 24 has an outer diameter of 0.9 mm and is provided with two bores 52, 53 each of which has an internal diameter of 0.2 mm. The diameter of the blind hole is here 0.5 mm and the depth of the blind hole is 1.0 mm. Electrical insulation of the thermocouple legs 42, 43 ensues via the insulation body 40. In a corresponding manner the thermocouple legs 42, 43 are electrically separated from each other in the holding capillaries also.

Figure 4A:
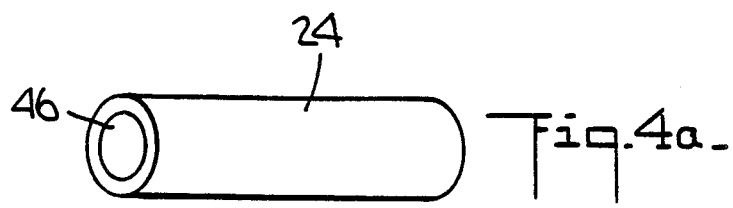
FIGS. 4a to 4c illustrate the introduction of a thermocouple into a ceramic tube.
Figure 4B:
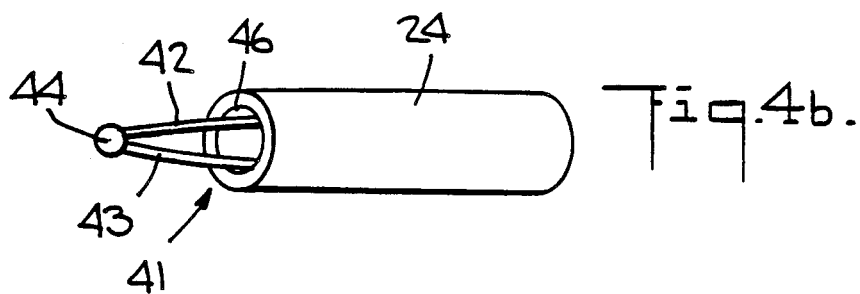
Figure 4C:
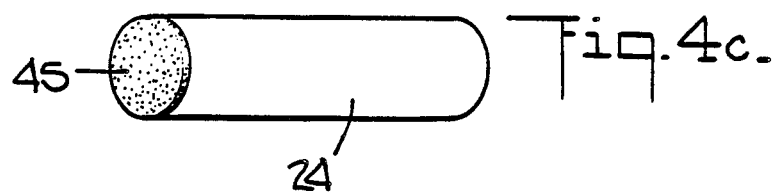

FIGS. 4a to 4c explain the process by which the thermocouple 41 is introduced into the ceramic capillary 24.

FIG. 4a shows a part of the ceramic capillary 24 which has a front aperture 46 as well as a rear aperture which cannot be seen in FIG. 4a. Since the ceramic capillary 24 has two bores 52, 53, it is often called a twin-hole ceramic tube. At the front opening of aperture 46 the insulating body 40 is already bored away to a predetermined depth, i.e. a blindhole is provided.

In FIG. 4b the manner of introduction of the thermocouple 41 into the ceramic capillary 24 is illustrated. Since the capillary 24, into which the two thermocouple legs 42, 43 have been introduced, has already been spot-drilled at the top by means of a boring machine, so that a blind hole resulted, the weld bead 44 of the two legs 42, 43 can be accommodated. The spot-drilling of the capillary 24 can be performed in various ways, e.g. by diamond boring, ultrasonic boring or laser beam boring.

FIG. 4c shows how after pulling the thermocouple 41 into the ceramic tube 24 to the end of this ceramic tube 24 is filled with an adhesive 45 and sealed. Welding of the tube 24 is also possible, e.g. with the aid of an oxygen or acetylene torch, an arc welder or a laser beam. By this measure the thermocouple is insulated from its surroundings to such an extent that it has a high stability against aggressive melts. By utilizing an adhesive no welding apparatus is required whereby no thermal loading of the tip of the capillary or of the thermocouple wire with the weld bead arises. The advantage of the welding consists in that the capillary can be sealed with its own material.

In what follows the functioning of the apparatus according to the invention will be described.

The metal or alloy melted in an over, e.g. an electrical furnace, is fed by means of a non-illustrated device into the sprue 19 from which it sinks through the tube 20 into the dish 12. Since the cooling head 14 is disposed at the floor of the dish 12, a large temperature difference arises between the dish 12 and the cooling head 14. This temperature difference has the effect that the molten metal or alloy solidifies from the bottom upwardly. With the aid of the invention it is now possible for the course of this solidification front to be monitored and thereby to draw inferences about the solidification conditions during the course of the process. In this way also inferences concerning the properties of the cast component also become possible.

During the directional solidification taking place from below upwardly the ceramic capillary 24 as well as the thermocouple 41 are fixed in the solidifying melt 2 and cannot thus be removed from the meal or alloy.

By taking measurements with numerous measurement sensors all the measurement capillaries 24–29, holding capillaries 30–35, thermocouple wires 42, 43 and plugs 48 are finished. The tips of the measurement capillaries 24–29 are then secured in previously prepared bores in the dish 12 with the aid of a ceramic cement.

Due to the fact that the measurement sensors are very small, the crystal growth in the melt is readily detected because the measurement sensors are introduced directly into the melt without influencing the crystallization thereby. For the detection of temperature gradients it is very important that the measurement sensors have only a very small size.

The temperature gradient in the horizontal or x-direction is defined, as is known, by the equation:

$$\text{grad } T = \frac{\delta T}{\delta x}$$

This differential coefficient may be approximated by the following difference coefficient G:

$$G = \frac{T_i - T_{i+1}}{x}$$

wherein $T_i = T_i(t)$ and $T_{i+1} = T_{i+1}(t)$ represent the measured temperatures of two thermocouples spaced by $\Delta x$. The greater $\Delta x$ is the more G deviates from the desired value for grad T; hence the smallest possible thermocouple tips are required which in addition only slightly influence the structure formation.

According to the law of propagation of errors the mean error $m_G$ for G is given by $$m_G = \frac{\sqrt{2}}{\Delta z} \pm \sqrt{m_T^2 + G^2 m_z^2}$$

wherein $$M_T = m_{T_i} = m_{T_{i+1}}$$

is the mean error of temperature;

$$m_z = m_{z_i} = m_{z_{i+1}}$$

is the mean error in the position of the measurement sensor.

In the technically important gradient range of $0 < G < 20$ K/mm, a realistic value of $m_z = \pm 0.1$ mm as well as a typical value $\Delta z = 6$ mm from which it follows that the temperature measurement error $m_T$ and thus the reliability of the thermocouple is of decisive significance. The measurement sensors according to the invention possess a high stability at high operational temperatures and thus fulfill this condition.

What is claimed is:

1. The combination of a vacuum furnace and a measurement sensor for the detection of temperatures in metal or alloy melts disposed in a casting mold, comprising: several graphite heating devices, a sprue, a casting dish, insulation surrounding the graphite heating devices, a cooling head provided below the casting dish into which latter said measurement sensor is built, and said measurement sensor comprising a thermocouple having two wire legs and a weld bead at a connection of these legs, and having a high heat-resistant thermal sheath surrounding the thermocouple, the weld bead of the thermocouple being disposed in the direct vicinity of one end of the sheath, the one end being a blind bore sealed with a $SiO_2$-free filler material exposed directly to the melt outside the sheath, the one end of the sheath being introduced directly into the melt while a second end of the sheath is in connection with a holding means.

2. A device for measuring the gradient of temperature relating to the solidification front of a metal or alloy melt, said device comprising:
   at least two measurement sensors for the detection of temperatures in meal or alloy melts disposed in a casting mold, said sensors each comprising a thermocouple having two legs and a connection of these legs, and having a high heat resistant thermal sheath surrounding the thermocouple, and having an outer diameter of substantially 0.9 to 1.2 mm, the connection of the thermocouple being disposed within a blind bore at one end of the sheath, the bore being sealed with a $SiO_2$-free filler material, said one end of said sheath being exposed directly to the melt inside the mold while a second end of the sheath is in connection with a holding means;
   said measurement sensors being arranged adjacent to each other in the direction of a co-ordinate.

3. A device according to claim 2, in which the measurement sensors are arranged vertically over one another in order to detect temperature gradients in a first coordinate direction.

4. Device for the measurement of temperatures in metal or alloy melts disposed in a casting form by means of measurement sensors each having two legs provided with a high heat resistant thermal sheath surrounding a thermocouple, comprising:
   (a) a surrounding sheath of a measurement sensor, the sheath being a tube (24) having two guide channels (52, 53) whereby in each of said guide channels (52 or 53, respectively) one leg (42 or 43, respectively) of a thermocouple is disposed;
   (b) on one end of the sheath and in the vicinity of the guide channels (52 or 53, respectively) of the measurement sensor the two legs (42, 43) being connected by means of a weld bead (44);
   (c) said sheath having a blind bore at one end forming a space in front of the guide channels (52 or 53, respectively) of the measurement sensor, said space being sealed with a $SiO_2$-free filler material (45);
   at least two measuring sensors being superimposed, the one end of the sheath of said sensors being introduced through said casting form directly into the melt while the other end is in connection with a holding means;
   the outputs of the at least two measuring sensors being employed for the detection of a temperature gradient in one coordinate direction.

* * * * *